Oct. 30, 1928.
H. L. HAHN
COMBINED MIRROR OR PICTURE FRAME AND RADIO HORN
Filed April 27, 1927
1,689,385
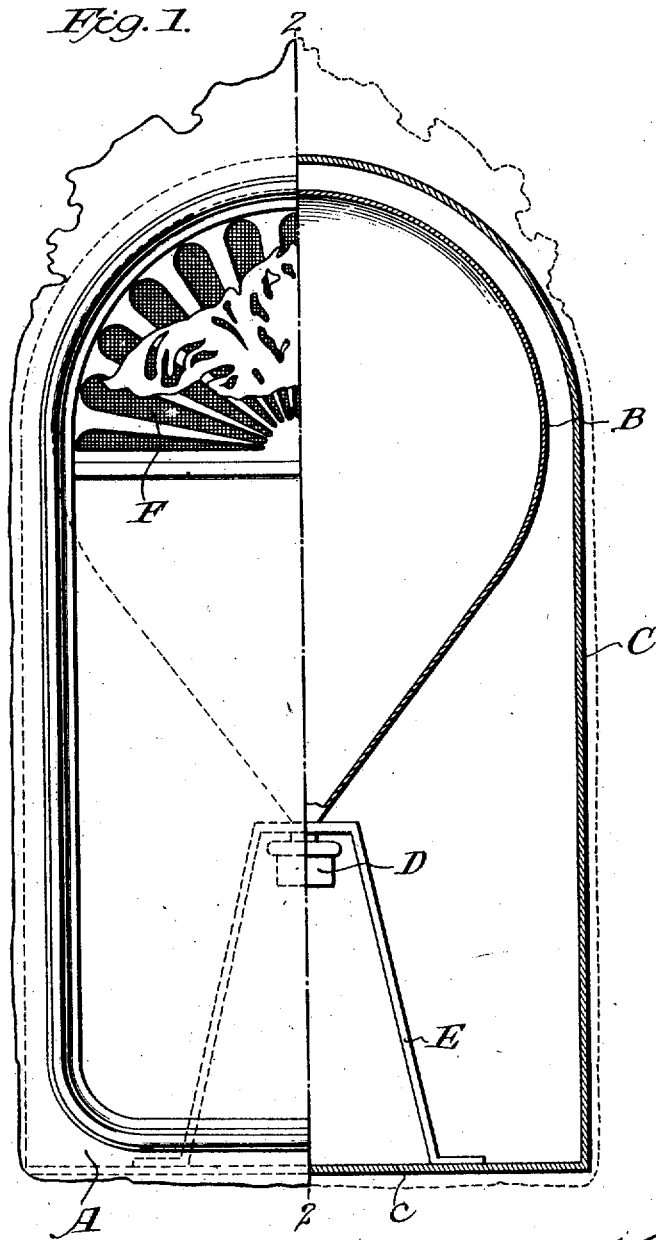
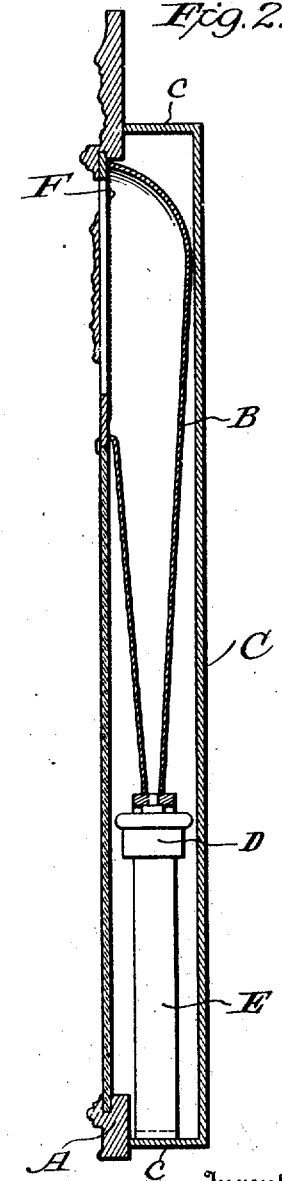

Patented Oct. 30, 1928.

1,689,385

UNITED STATES PATENT OFFICE.

HARRY L. HAHN, OF LANCASTER, PENNSYLVANIA.

COMBINED MIRROR OR PICTURE FRAME AND RADIOHORN.

Application filed April 27, 1927. Serial No. 187,009.

This invention relates to house furnishings or articles used for amusement or interior decoration, and more particularly to a structure in the form of a radio horn for mirrors, pictures or the backs of chairs.

The object of the invention is to provide a frame structure combining with a mirror or picture or chair back a sound box or radio horn attached behind a louver front at the upper end of the mirror or picture frame.

The invention will first be hereinafter more particularly described, with reference to the accompanying drawings, which are to be taken as a part of this specification, and then pointed out in the claims at the end of the description.

In said drawings, Fig. 1 is a front elevation partly in vertical section representing a mirror or picture frame with a radio horn attachment embodying my invention, and Fig. 2 is a vertical longitudinal sectional view taken on the line 2—2 of Fig. 1.

Referring to said drawings, in which the same reference letters are used to denote corresponding parts in different views, the letter A may denote a frame structure preferably of ornamental design adapted to hold either a mirror or a picture, and having the upper part thereof of louver-window-like construction, or composed of louver-boards, and also having associated therewith a sound box or radio horn B, having its mouth arranged behind the louver front. Said horn may be enclosed within a cabinet or casing formed by the mirror or picture and frame in which the mirror or picture is secured and a box-like structure C having on opposite sides thereof and at its top and bottom marginal flanges c, which are turned toward and abut against the back of the frame in which the mirror or picture is secured. The sound box or radio horn may be of the oblong form shown, with its lower end secured to a sound-reproducing device or unit D, carried by a supporting bracket E, arranged within the enclosure formed by the mirror or picture and its supporting frame and the box-like structure C behind the frame. The horn may be of any suitable construction preferably having a wide mouth arranged behind the louver front. A screen F is interposed between the louver front and the mouth of the horn, as shown.

The frame A and box-like structure C may be made of aluminum, or wood, or any suitable material. The sound box is preferably made of "composition paper" of papier-mâché.

It will be understood of course that various changes may be made in the details and arrangement of parts without departing from the spirit and scope of my invention, and I desire it to be understood that the appended claims are not limited to the specific construction shown and described.

Having thus described my invention, what I claim as new and desire to secure by Letters Patent of the United States is:

1. A frame for a mirror or picture having an upper end portion of louver-window-like construction combined with a radio horn having its mouth arranged behind the louver front.

2. In combination with a frame for a mirror or picture having an upper portion of louver-window-like construction, a sound box or radio horn secured to the back of said frame with the mouth of the horn arranged behind the louver front.

3. A frame for a mirror or picture having an upper end portion of louver-window-like construction combined with a radio horn having its mouth arranged behind the louver front; a screen being secured over the mouth of the horn between it and the louver front.

4. A frame for a mirror or picture having an upper end portion of louver-window-like construction combined with a radio horn having its mouth arranged behind the louver front thereof; said horn being of oblong form supported upon a sound-reproducing device and enclosed within a casing consisting of the frame and a shallow box-like structure having side and end flanges turned toward and abutting against the back of the frame to which said box-like structure is secured.

5. A combined frame for a mirror or picture and radio horn comprising a frame structure having the upper part thereof of louver-window-like construction and a radio horn concealed behind the frame; said horn having one end connected with a sound reproducing unit and having its mouth arranged behind the louver front.

6. A combined frame for a mirror or picture and radio horn comprising in a unitary structure an oblong shallow box-like body open on one side and a cover for said side consisting of a mirror or picture frame having an upper end-portion of louver-window-like construction, and a radio horn concealed within said structure and having its mouth arranged behind said louver front.

In testimony whereof I affix my signature.

HARRY L. HAHN.